United States Patent Office 3,077,495
Patented Feb. 12, 1963

3,077,495
PROCESS FOR MAKING CINNAMYL ESTERS
Leonard Levine, Lake Jackson, Tex., assignor to The Dow Chemical Company, Midland, Mich., a corporation of Delaware
No Drawing. Filed June 19, 1961, Ser. No. 117,823
3 Claims. (Cl. 260—491)

This invention relates to new methods for making esters of cinnamyl alcohol. Many such esters are known and are useful in perfumes, flavoring materials and the like and as chemical intermediates.

According to the invention, cinnamyl esters are readily made in high yield by the pyrolysis of diesters of 1-phenyl-1,3-propanediol. The reaction can be represented as follows:

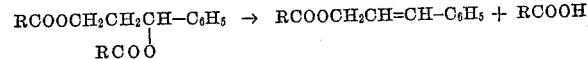

wherein RCO represents the acyl radical of an organic monocarboxylic acid.

The pyrolysis can be conveniently carried out by passing the diester through a reaction zone maintained at a temperature of about 450–600° C. This is most conveniently done at atmospheric pressure but can be done at elevated or reduced pressure. The latter may sometimes be desirable as an aid in volatilizing very high-boiling esters.

The acid, RCOOH, with which the diester is esterified can be any that is stable under the reaction conditions. The preferred acids are the fatty acids; i.e., the alkanoic and alkenoic acids having 2 to about 18 carbon atoms, and preferably 2 to about 4 carbon atoms. Among such preferred acids are acetic, propionic, butyric and isobutyric acids, though benzoic, alkylbenzoic and halobenzoic acids, and the like, can be used.

The diester to be pyrolyzed can be made in any convenient manner, a suitable one being the condensation of styrene, formaldehyde and the acid, RCOOH, in the presence of an acid catalyst:

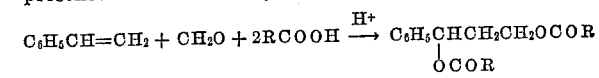

This reaction is well known and is commonly conducted in the presence of sulfuric acid.

In the pyrolysis reaction it is preferred, though not essential, that a small amount of a polymerization inhibitor be mixed with the diester to be pyrolyzed and that an inert gas, such as nitrogen, be passed concurrently into the reaction zone. These precautions inhibit any tendency of the cinnamyl esters to polymerize. Suitable inhibitors include hydroquinone, catechols, and other phenolic inhibitors of free-radical polymerization.

When the pyrolysis is conducted at temperatures below 475° C., long contact times are necessary to achieve satisfactory conversions. On the other hand, temperatures above about 575° C. result in some decrease in yield because of the thermal degradation and/or polymerization of the cinnamyl ester. Accordingly, the preferred temperature is about 475–575° C.

The reaction zone may be an empty, heated chamber. However, in order to facilitate heat transfer and maintain a constant temperature therein, it is preferred that it be packed with an inert, granular solid. Suitable materials include broken glass, glass helices, crushed ceramics, and the like. A suitable and convenient packing is the material sold commercially as Berl saddles.

The practice of the invention is illustrated by the following examples.

Example 1

A vertical Vycor tube of approximately 1 inch internal diameter was packed to a height of 5 inches with 6 mm. Berl saddles. The upper portion of the tube was equipped with an inlet for nitrogen and a dropping funnel. Heat was supplied by means of an electric furnace placed around the packed section of the tube. Into the dropping funnel was placed 75 g. of the diacetate of 1-phenyl-1,3-propanediol containing 1.5 g. of para-tertiary-butylcatechol. The temperature was maintained in the range of from 523° to 571° C. while the solution was added dropwise at a rate of approximately 1 drop every 2 seconds. The reaction product was collected in an ice-cooled receiver, dissolved in benzene, washed with dilute NaOH, washed with water, dried over anhydrous calcium chloride and distilled. The yield of cinnamyl acetate was 70 percent. Conversion was substantially complete.

Example 2

The reaction of Example 1 was repeated with the exception that the temperature was maintained in the range of from 562° to 575° C. A 64 percent yield was obtained.

Good yields of the corresponding cinnamyl esters are obtained when the diacetate used in the above example is replaced with the dipropionate, dibutyrate, dibenzoate, or bis(chlorobenzoate).

I claim:

1. The process for making a cinnamyl ester having the formula $$RCOOCH_2CH=CH-C_6H_5$$

wherein RCO represents the acyl radical of an organic monocarboxylic acid that is stable under the conditions of the process, which process comprises pyrolyzing a diester having the formula

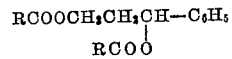

wherein RCO has the same significance as above, by passing the diester through a reaction zone maintained at a temperature of about 450 to 600° C.

2. The process defined in claim 1 wherein the acid is an alkanoic acid containing from 2 to 4 carbon atoms.

3. The process defined in claim 1 wherein the acid is acetic acid.

References Cited in the file of this patent

UNITED STATES PATENTS

| | | |
|---|---|---|
| 2,798,088 | Ritter et al. | July 2, 1957 |
| 2,901,506 | Bullock et al. | Aug. 25, 1959 |

OTHER REFERENCES

Chemical Abstracts, Col. 10040, 1959.